(12) United States Patent
Inai

(10) Patent No.: US 11,387,664 B2
(45) Date of Patent: Jul. 12, 2022

(54) ELECTRONIC DEVICE AND CONTROL METHOD

(71) Applicant: CANON KABUSHIKI KAISHA, Tokyo (JP)

(72) Inventor: Kento Inai, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/871,458

(22) Filed: May 11, 2020

(65) Prior Publication Data

US 2020/0366113 A1 Nov. 19, 2020

(30) Foreign Application Priority Data

May 16, 2019 (JP) .............................. JP2019-092845

(51) Int. Cl.
*H02J 7/00* (2006.01)
*G06F 1/26* (2006.01)
*H01M 10/42* (2006.01)
*H01M 50/20* (2021.01)
*G03B 17/02* (2021.01)

(52) U.S. Cl.
CPC ............ *H02J 7/0068* (2013.01); *G03B 17/02* (2013.01); *G06F 1/26* (2013.01); *H01M 10/4257* (2013.01); *H01M 50/20* (2021.01); *H02J 7/0042* (2013.01); *H02J 7/0045* (2013.01); *G03B 2217/007* (2013.01); *H02J 2207/30* (2020.01)

(58) Field of Classification Search
CPC ..... G03B 17/02; G03B 2217/007; G06F 1/26; H01M 10/425; H01M 10/4257; H01M 10/623; H01M 50/20; H02J 2207/30; H02J 7/0042; H02J 7/0045
See application file for complete search history.

(56) References Cited

U.S. PATENT DOCUMENTS

| 2013/0113417 | A1 | 5/2013 | Nakashima |
| 2016/0204623 | A1* | 7/2016 | Haggerty ................. H02J 7/00 320/162 |
| 2020/0106291 | A1 | 4/2020 | Inai |

FOREIGN PATENT DOCUMENTS

| JP | 2003015782 A | 1/2003 | |
| JP | 2004229450 A | * 8/2004 | ........... H02J 7/0072 |
| JP | 2013102625 A | 5/2013 | |

* cited by examiner

*Primary Examiner* — Ryan Johnson
(74) *Attorney, Agent, or Firm* — Canon U.S.A., Inc. I.P. Division

(57) ABSTRACT

An electronic device includes a first connection unit configured to connect to a first external device, and a second connection unit configured to connect to a second external device. A position of the first connection unit placed in the electronic device is a position where at least a part of the first connection unit is hidden in a case where the second connection unit is connected to the second external device.

18 Claims, 7 Drawing Sheets

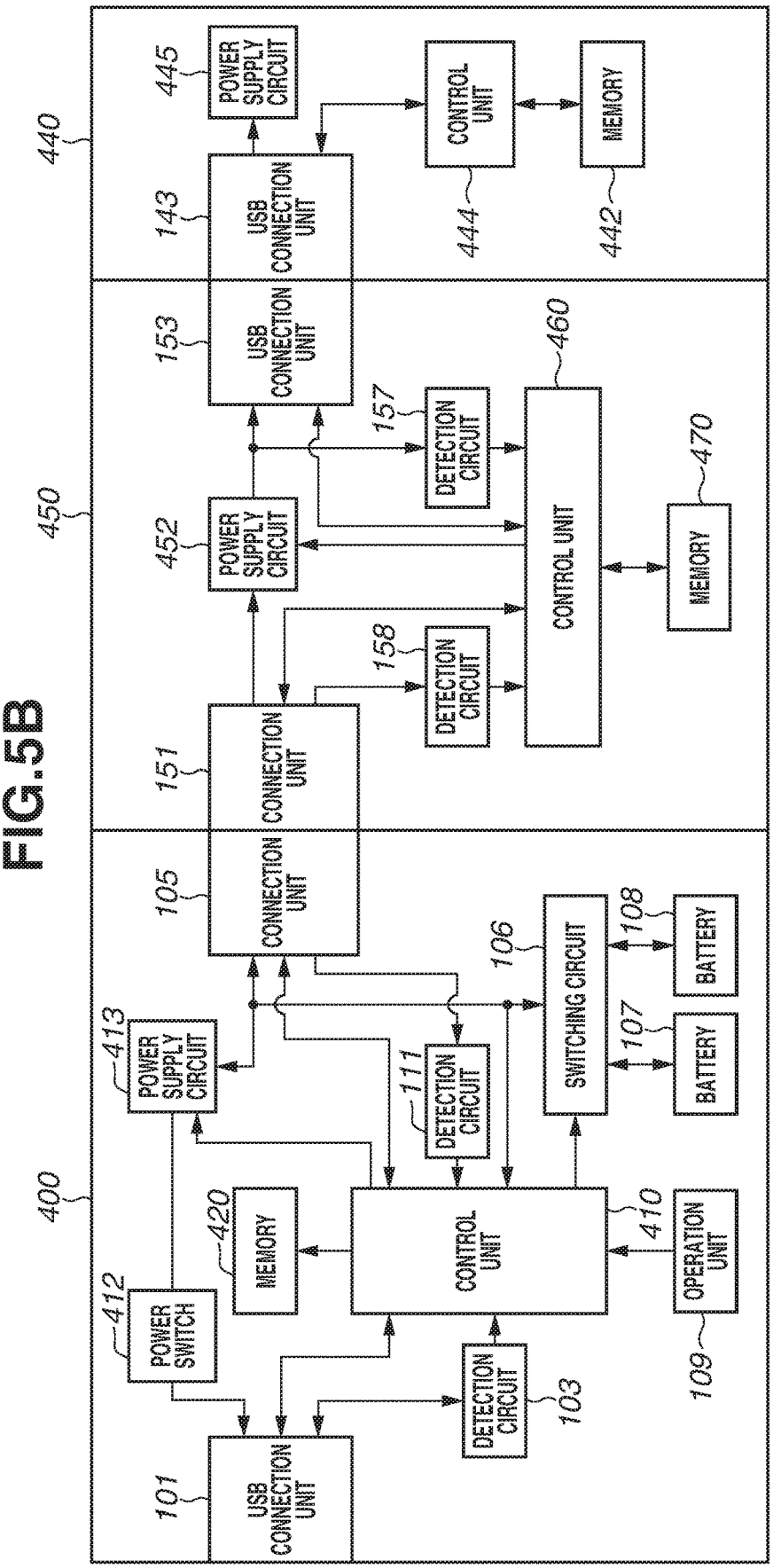

ELECTRONIC DEVICE AND CONTROL METHOD

BACKGROUND OF THE DISCLOSURE

Field of the Disclosure

Aspects of the disclosure generally relate to an electronic device and a method for controlling the same.

Description of the Related Art

An electronic device (e.g., a digital camera) is known which includes a USB connection unit that is compliant with the Universal Serial Bus (USB) standard. Such electronic devices include an electronic device capable of charging a battery with power received from an external device via a USB connection unit. Such electronic devices also include an electronic device capable of connecting to a battery grip. One or more batteries can connect to the battery grip, and power from the one or more batteries can be supplied to the electronic device.

The publication of Japanese Patent Application Laid-Open No. 2013-102625 discusses a method for charging the batteries in a predetermined order, in a case where batteries is connected to the battery grip.

The publication of Japanese Patent Application Laid-Open No. 2003-15782 discusses a method for performing control to determine whether to supply power to a USB device according to the type of power supply.

If both an electronic device (e.g., a digital camera) and a battery grip include connection units including USB connection units, it is conceivable that a circuit configuration related to the connection units becomes complex. Further, it is also necessary to consider appropriate positions in the electronic device or the battery grip where the connection units should be placed.

SUMMARY OF THE DISCLOSURE

According to an aspect of the embodiments, the circuit configuration or arrangement of connection units is improved.

According to an aspect of the embodiments, an electronic device includes a first connection unit configured to connect to a first external device, and a second connection unit configured to connect to a second external device, wherein a position of the first connection unit placed in the electronic device is a position where at least a part of the first connection unit is hidden in a case where the second connection unit is connected to the second external device.

According to an aspect of the embodiments, there is provided an electronic device comprising a first connection unit configured to connect to a first external device, a second connection unit configured to connect to a second external device, and a determination unit that determines whether the second connection unit is connected to the second external device, wherein the determination unit is enabled in a case where the second connection unit is not connected to the second external device, and the determination unit is disabled in a case where the second connection unit is connected to the second external device.

According to an aspect of the embodiments, there is provided a method comprising determining whether a second connection unit is connected to a second external device, enabling a determination unit of an electronic device in a case where the second connection unit is not connected to the second external device, disabling the determination unit in a case where the second connection unit is connected to the second external device, and causing the determination unit to determine whether a first connection unit is connected to a first external device in a case where the determination unit is enabled.

According to an aspect of the embodiments, there is provided a non-transitory storage medium storing a program that causes a computer to execute a method, the method comprising determining whether a second connection unit is connected to a second external device, enabling a determination unit of an electronic device in a case where the second connection unit is not connected to the second external device, disabling the determination unit in a case where the second connection unit is connected to the second external device, and causing the determination unit to determine whether a first connection unit is connected to a first external device in a case where the determination unit is enabled.

Further features and aspects of the embodiments will become apparent from the following embodiments.

BRIEF DESCRIPTION OF THE DRAWINGS

FIG. 5B is a block diagram illustrating examples of configurations of the electronic device 400, the imaging apparatus 450, and the external storage device 440 illustrated in FIG. 4B.

DESCRIPTION OF THE EMBODIMENTS

Example embodiments, features, and aspects of the disclosure will be described below with reference to the drawings. However, aspects of the disclosure are not limited to the following embodiments.

First Example Embodiment

Figure 1A:
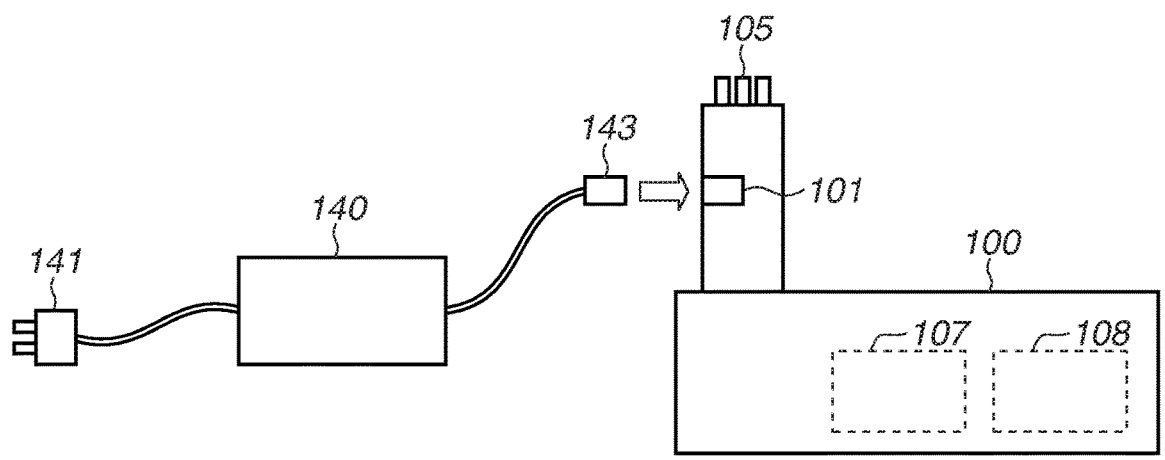
FIG. 1A is a diagram illustrating an example of a connection between an electronic device 100 and a Universal Serial Bus (USB) charger 140 according to a first example embodiment.

FIG. 1A is a diagram illustrating an example of the connection between an electronic device 100 and a Universal Serial Bus (USB) charger 140 according to a first example embodiment.

The electronic device 100 is, for example, a battery grip and is connected to two batteries 107 and 108. The batteries 107 and 108 are chargeable batteries such as lithium-ion batteries. The electronic device 100 includes a USB connection unit 101 and a connection unit 105. The USB connection unit 101 is a unit compliant with the USB standard.

The USB charger 140 is an external device and includes a connection unit 141 and a USB connection unit 143. The connection unit 141 is an alternating current (AC) plug. The USB connection unit 143 is a unit compliant with the USB standard. The USB connection unit 101 of the electronic device 100 can connect to the USB charger 140 via the USB connection unit 143. The connection unit 141 is connected to commercial power. The USB charger 140 converts alternating current power into direct current power and supplies the power to the electronic device 100 via the USB connection unit 143. If connected to the USB charger 140, the electronic device 100 can charge the batteries 107 and 108 in a predetermined order.

Figure 1B:
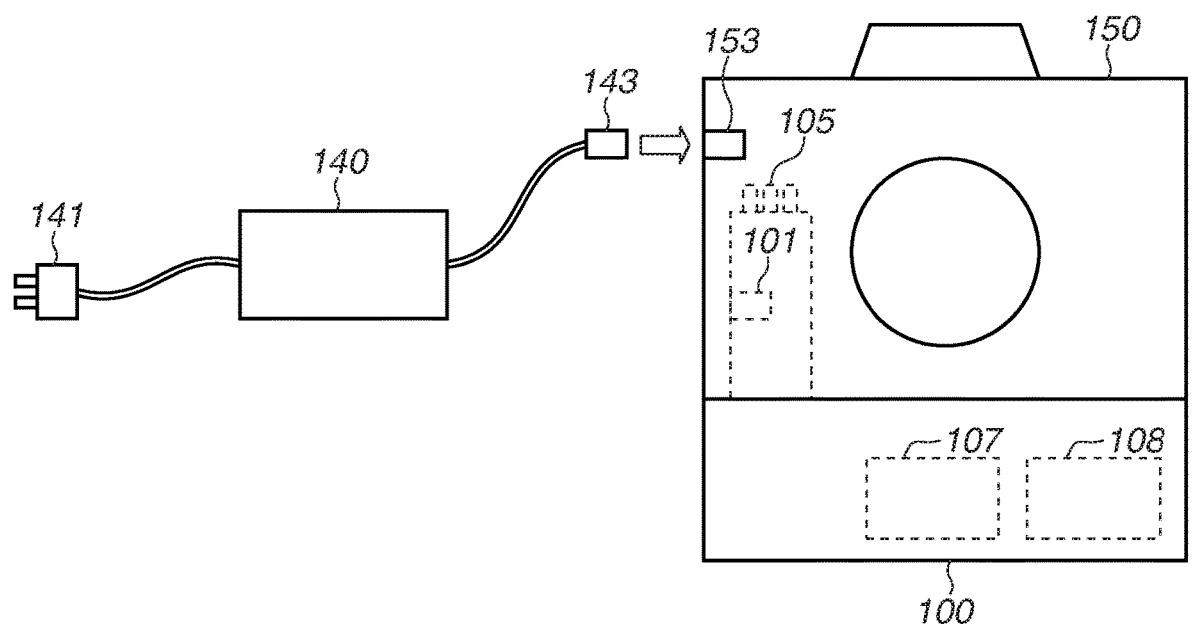
FIG. 1B is a diagram illustrating examples of connections between the electronic device 100, an imaging apparatus 150, and the USB charger 140 according to the first example embodiment.

Next, with reference to FIG. 1B, examples of the connections between the electronic device 100, an imaging apparatus 150, and the USB charger 140 are described.

The electronic device 100 can connect to the imaging apparatus 150 via the connection unit 105. The connection unit 105 is a unit connected to a connection unit 151 of the imaging apparatus 150. One or both of the batteries 107 and 108 supply power to the imaging apparatus 150 via the connection unit 105. The USB connection unit 101 is placed near the connection unit 105. Consequently, in the state where the electronic device 100 is connected to the imaging apparatus 150, the USB connection unit 101 is hidden inside the imaging apparatus 150.

The imaging apparatus 150 is an electronic device (e.g., a digital camera or a mobile phone) capable of operating as a digital camera. The imaging apparatus 150 includes a USB connection unit 153. The USB connection unit 153 is a unit compliant with the USB standard. The USB connection unit 153 can connect to the USB charger 140 via the USB connection unit 143. If the USB charger 140 is connected to the imaging apparatus 150 via the USB connection unit 143 in the state where the electronic device 100 is connected to the imaging apparatus 150, the USB charger 140 supplies power to the electronic device 100 via the USB connection unit 143 and the imaging apparatus 150. If connected to the USB charger 140 via the imaging apparatus 150, the electronic device 100 can charge the batteries 107 and 108 in a predetermined order.

In the state where the electronic device 100 is connected to the imaging apparatus 150, the USB connection unit 101 is hidden inside the imaging apparatus 150. Thus, only the USB connection unit 153 serves as a connection unit for charging. Consequently, the electronic device 100 can simplify a charging circuit, facilitate controlling, and reduce circuit cost.

Alternatively, a part of the USB connection unit 101 may be hidden inside the imaging apparatus 150. In the state where the connection unit 105 is connected to the imaging apparatus 150, the USB connection unit 101 is placed at the position where at least a part of the USB connection unit 101 is hidden.

Further, instead of the USB charger 140, an external device such as a mobile battery or a personal computer (PC) may be provided.

Figure 2A:
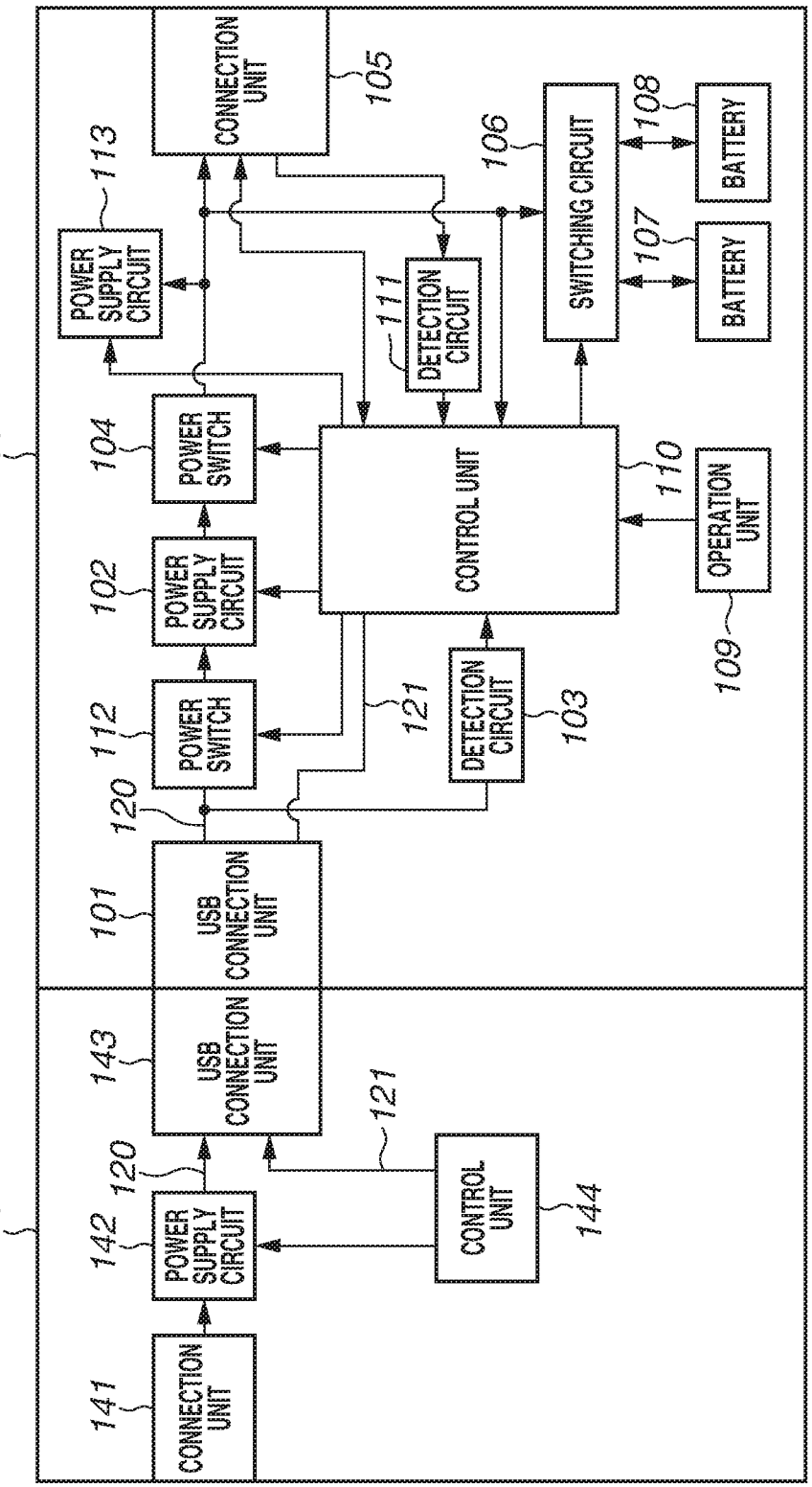
FIG. 2A is a block diagram illustrating components of the electronic device 100 and the USB charger 140 illustrated in FIG. 1A.

Next, with reference to FIG. 2A, the components of the electronic device 100 and the USB charger 140 illustrated in FIG. 1A are described.

The USB charger 140 includes the connection unit 141, a power supply circuit 142, the USB connection unit 143, and a control unit 144. The connection unit 141 is an AC plug and is connected to the commercial power. The power supply circuit 142 is connected to the connection unit 141 and converts alternating current power into direct current power. The power supply circuit 142 outputs the direct current power to the USB connection unit 143 via a power supply line 120 (VBUS). The control unit 144 is connected to the USB connection unit 143 via a signal line 121. The power supply circuit 142 supplies the direct current power to the electronic device 100 via the USB connection units 143 and 101.

The control unit 144 includes a microcomputer (or a microprocessor) and a memory. The microcomputer (or the microprocessor) of the control unit 144 can control the components of the USB charger 140 according to a program stored in the memory of the control unit 144. The control unit 144 controls the power supply circuit 142 and controls communication with a control unit 110 via the USB connection units 143 and 101.

The USB connection unit 143 of the USB charger 140 is connected to the USB connection unit 101 of the electronic device 100. The power supply line 120 and the signal line 121 within the USB charger 140 are connected to a power supply line 120 and a signal line 121, respectively, in the electronic device 100 via the USB connection units 143 and 101. The power supply lines 120 are VBUS compliant with the USB standard. The signal lines 121 are signal lines for D+, D−, the configuration channel (CC), or the high-speed differential signal based on the USB standard.

The electronic device 100 is the battery grip, and includes the USB connection unit 101, a power supply circuit 102, a detection circuit 103, a power switch 104, a switching circuit 106, the battery 107, the battery 108, an operation unit 109, and the control unit 110. Further, the electronic device 100 includes a detection circuit 111, a power switch 112, and a power supply circuit 113.

In the electronic device 100, the power supply line 120 is connected to the battery 107 or 108 via the power switch 112, the power supply circuit 102, the power switch 104, and the switching circuit 106. The control unit 110 controls the power switch 112, the power supply circuit 102, the power switch 104, and the switching circuit 106.

The power switch 112 is provided between the USB connection unit 101 and the battery 107 or 108. The power supply line 120 supplies power to the power supply circuit 102 via the power switch 112. The detection circuit 103 is a detection unit and detects whether an overvoltage is applied to the power supply line 120. If the detection circuit 103 detects that an overvoltage is applied to the power supply line 120, the control unit 110 brings the power switch 112 into an off state, thereby preventing the application of an overvoltage to the subsequent circuit.

The power supply circuit 102 is a power supply unit that includes, for example, a direct-current-to-direct-current (DC/DC) converter, that converts the voltage of the power supply line 120 into a different voltage. The power supply circuit 102 supplies the converted voltage to the connection unit 105, the switching circuit 106, and the power supply circuit 113 via the power switch 104.

The switching circuit 106 connects the power supply circuit 102 to either of the batteries 107 and 108. The power supply circuit 102 supplies power to either of the batteries 107 and 108 via the power switch 104 and the switching circuit 106. The power supply circuit 102 controls a voltage and a current to charge the battery 107 or 108 in auxiliary charging, fast constant current charging, and fast constant voltage charging. The power supply circuit 102 can charge the batteries 107 and 108 in a predetermined order.

If the USB connection unit 101 is connected to the USB connection unit 143, the detection circuit 103 detects that a voltage is applied to the power supply line 120. Then, the control unit 110 controls the connection of the switching circuit 106, selects the battery 107 or 108 as a charging target, measures the voltage of the battery 107 or 108, controls the power supply circuit 102, and controls a charging voltage to be supplied to the battery 107 or 108. The control unit 110 brings the power switch 104 into an on state and starts charging the battery 107 or 108.

The detection circuit 111 detects whether the connection unit 105 of the electronic device 100 is connected to the connection unit 151 of the imaging apparatus 150. Then, the detection circuit 111 outputs a detection signal to the control unit 110. The control unit 110 receives the detection signal and monitors the connection state of the imaging apparatus 150.

The operation unit 109 includes operation members (a release button and a dial) which are used when the electronic device 100 is used as a battery grip.

The power supply circuit 113 is a circuit that generates a voltage that the components of the electronic device 100 require, based on power supplied from the battery 107, the battery 108, or the power supply circuit 102. The power supply circuit 113 includes, for example, a DC/DC converter or a series regulator.

The control unit 110 includes a microcomputer (or a microprocessor) and a memory. The microcomputer (or the microprocessor) of the control unit 110 can control the components of the electronic device 100 according to a program stored in the memory of the control unit 110. The control unit 110 controls charging and discharging of the battery 107 or 108 and communicates with the USB charger 140 or the imaging apparatus 150. The control unit 110 is supplied with power from the USB connection unit 101 and controls the charging of the battery 107 or 108.

Figure 2B:
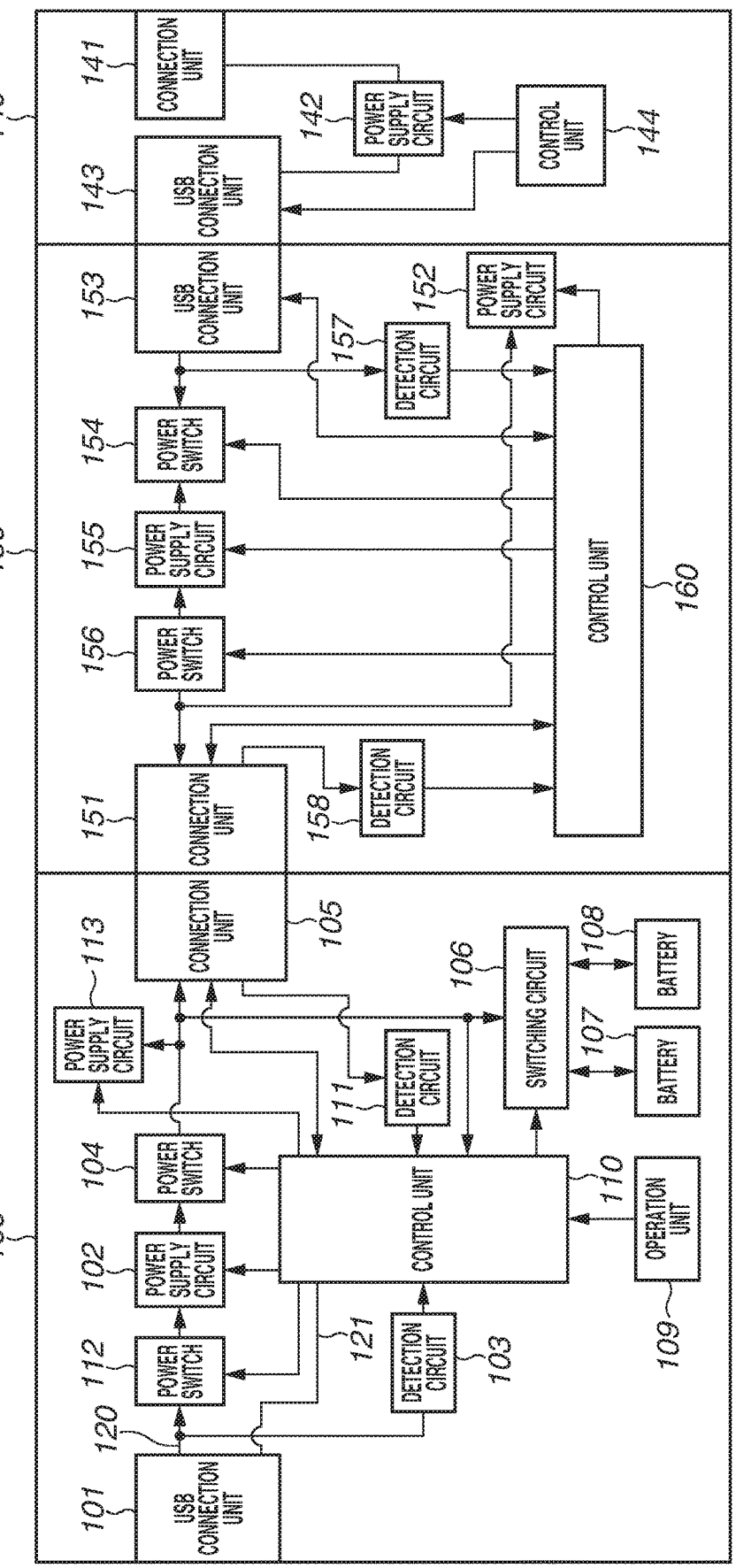
FIG. 2B is a block diagram illustrating components of the electronic device 100, the imaging apparatus 150, and the USB charger 140 illustrated in FIG. 1B.

Next, with reference to FIG. 2B, the components of the electronic device 100, the imaging apparatus 150, and the USB charger 140 illustrated in FIG. 1B are described.

When the electronic device 100 is connected to the imaging apparatus 150, the USB connection unit 101 of the electronic device 100 is hidden inside the imaging apparatus 150 and cannot be used. Consequently, in the electronic device 100, a power supply path can be simplified. In addition, control of charging and discharging and an accompanying circuit configuration can be simplified.

The components of the electronic device 100 and the USB charger 140 illustrated in FIG. 2B are similar to the components of the electronic device 100 and the USB charger 140 illustrated in FIG. 2A. The imaging apparatus 150 includes the connection unit 151, a power supply circuit 152, the USB connection unit 153, a power switch 154, a power supply circuit 155, a power switch 156, a detection circuit 157, a detection circuit 158, and a control unit 160.

The connection unit 151 is a unit connected to the connection unit 105 of the electronic device 100. If the imaging apparatus 150 is not connected to the electronic device 100, a battery (not illustrated) is connected to the connection unit 151, whereby the imaging apparatus 150 can operate. If the USB connection unit 153 is connected to the USB charger 140 in the state where the battery is connected to the connection unit 151, the imaging apparatus 150 can charge a battery (not illustrated) in the imaging apparatus 150.

The connection unit 151 is connected to the connection unit 105 of the electronic device 100. If the USB charger 140 is not connected to the imaging apparatus 150, the imaging apparatus 150 can operate by power supplied from the battery 107 or 108 in the electronic device 100.

The USB charger 140 and the imaging apparatus 150 are connected together, whereby the electronic device 100 can charge the battery 107 or 108. The power supply line 120 and the signal line 121 within the USB charger 140 are connected to a power supply line and a signal line, respectively, within the imaging apparatus 150 via the USB connection units 143 and 153. The power supply circuit 142 supplies power to the USB connection unit 153 via the USB connection unit 143. The control unit 144 controls the power supply circuit 142 and controls communication with the control unit 160 via the USB connection units 143 and 153.

The USB connection unit 153 supplies the power to the power supply circuit 155 via the power switch 154. The detection circuit 157 detects whether an overvoltage is applied to a power supply line of the USB connection unit 153. If the detection circuit 157 detects that the overvoltage is applied to the power supply line, the control unit 160 brings the power switch 154 into an off state, thereby preventing the application of the overvoltage to the subsequent circuit.

The power supply circuit 155 includes, for example, a DC/DC converter and converts the voltage of the power supply line of the USB connection unit 153 to a different voltage. The power supply circuit 155 supplies the converted voltage to the connection unit 151, the power supply circuit 152, and the battery (not illustrated) within the imaging apparatus 150 via the power switch 156.

When the USB connection unit 153 is connected to the USB connection unit 143, the detection circuit 157 detects that a voltage is applied to the power supply line of the USB connection unit 153. Then, the control unit 160 brings the power switch 156 into an on state. The power supply circuit 155 controls a voltage and a current and thereby can charge the battery 107 or 108 within the electronic device 100 by auxiliary charging, constant current charging, and constant voltage charging.

The power supply circuit 152 is a circuit that generates a voltage which the components of the imaging apparatus 150 require, based on power supplied from the power supply circuit 155 or the battery (not illustrated) within the imaging apparatus 150. The power supply circuit 152 includes, for example, a DC/DC converter or a series regulator.

The detection circuit 158 detects whether the imaging apparatus 150 is connected to the electronic device 100. Then, the detection circuit 158 outputs a detection signal to the control unit 160. The control unit 160 controls the charging and the discharging of the battery 107 or 108 in the electronic device 100 and communicates with the USB charger 140 and the electronic device 100.

The control unit 160 includes a microcomputer (or a microprocessor) and a memory. The microcomputer (or the microprocessor) of the control unit 160 can control the components of the imaging apparatus 150 according to a program stored in the memory of the control unit 160. The control unit 160 is supplied with power from the USB connection unit 153 and controls the charging of the battery 107 or 108 in the electronic device 100. If the USB connection unit 153 is connected to the USB connection unit 143, the detection circuit 157 detects that a voltage is applied to the power supply line of the USB connection unit 153. Then, the control unit 160 communicates with the control unit 110. The control unit 110 gives an instruction to control the connection of the switching circuit 106, selects the battery 107 or 108 as a charging target, and measures the voltage of the battery 107 or 108. The control unit 160 communicates with the control unit 110, and according to the voltage of the battery 107 or 108, controls the power supply circuit 155 and controls a charging voltage supplied to the battery 107 or 108. The control unit 160 brings the power switch 156 into an on state and starts charging the battery 107 or 108.

Figure 3:
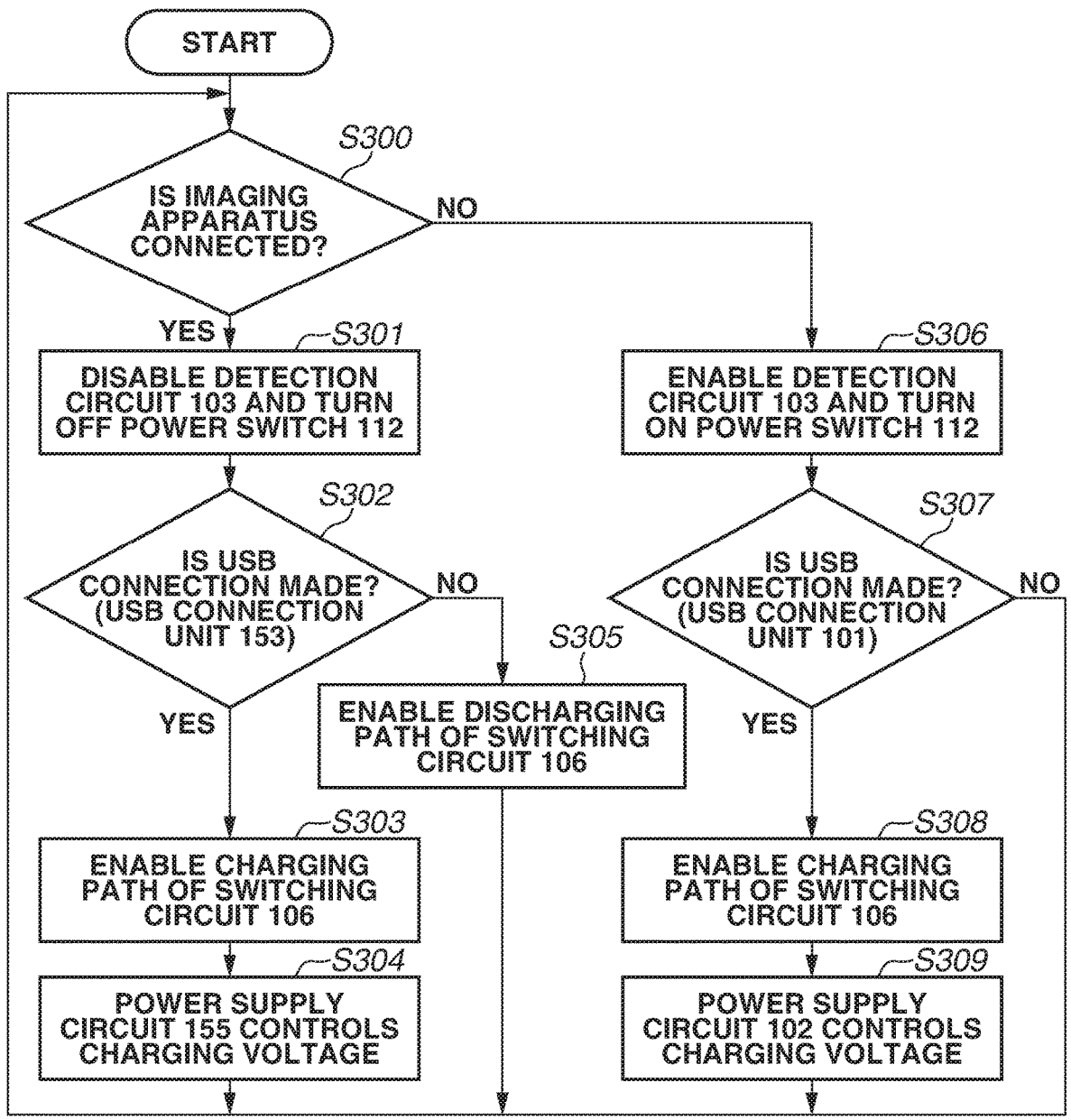
FIG. 3 is a flowchart illustrating a control method according to the first example embodiment and a second example embodiment.

Next, with reference to FIG. 3, a control method according to the first example embodiment is described.

In step S300, the control unit 110 determines whether the connection unit 105 of the electronic device 100 is connected to the connection unit 151 of the imaging apparatus 150. For example, if the detection circuit 111 detects that the connection unit 105 of the electronic device 100 is connected to the connection unit 151 of the imaging apparatus 150, the detection circuit 111 outputs a detection signal to the control unit 110. If the detection signal is received from the detection circuit 111, the control unit 110 determines that the connection unit 105 of the electronic device 100 is connected to the connection unit 151 of the imaging apparatus 150. Alternatively, if communication with the control unit 160 is established, the control unit 110 may determine that the connection unit 105 of the electronic device 100 is connected to the connection unit 151 of the imaging apparatus 150.

If the control unit 110 determines that the connection unit 105 of the electronic device 100 is connected to the connection unit 151 of the imaging apparatus 150 (YES in step S300), the control unit 110 advances to step S301. If the control unit 110 determines that the connection unit 105 of the electronic device 100 is not connected to the connection unit 151 of the imaging apparatus 150 (NO in step S300), the control unit 110 advances to step S306.

In step S301, since the USB connection unit 101 is hidden inside the imaging apparatus 150 and is not used, the control unit 110 disables the detection circuit 103 and brings the power switch 112 into an off state. If the electronic device 100 is connected to the imaging apparatus 150, the USB connection unit 101 is hidden inside the imaging apparatus 150, and therefore, the detection circuit 103 is not necessary. In this case, a voltage is not applied to the power supply line 120 of the USB connection unit 101, and therefore, the control unit 110 brings the power switch 112 into an off state. Even if a voltage is applied to the power supply line 120 of the USB connection unit 101 due to a re-creation of the device, the control unit 110 brings the power switch 112 into an off state. Thus, it is possible to prevent an erroneous operation in the charging and discharging.

In step S302, the control unit 110 communicates with the control unit 160 and determines whether the USB connection unit 153 of the imaging apparatus 150 is connected to the USB connection unit 143 of the USB charger 140. The detection circuit 157 detects whether a voltage is applied to the power supply line of the USB connection unit 153. If it is detected that a voltage is applied to the power supply line of the USB connection unit 153, the control unit 160 determines that the USB connection unit 153 of the imaging apparatus 150 is connected to the USB connection unit 143 of the USB charger 140. If it is detected that a voltage is not applied to the power supply line of the USB connection unit 153, the control unit 160 determines that the USB connection unit 153 of the imaging apparatus 150 is not connected to the USB connection unit 143 of the USB charger 140. The control unit 160 transmits the determination result to the control unit 110. Based on the received determination result, the control unit 110 determines whether the USB connection unit 153 of the imaging apparatus 150 is connected to the USB connection unit 143 of the USB charger 140.

If the control unit 110 determines that the USB connection unit 153 of the imaging apparatus 150 is connected to the USB connection unit 143 of the USB charger 140 (YES in step S302), the control unit 110 advances to step S303. If the control unit 110 determines that the USB connection unit 153 of the imaging apparatus 150 is not connected to the USB connection unit 143 of the USB charger 140 (NO in step S302), the control unit 110 advances to step S305.

In step S303, to charge the battery 107 or 108 with power supplied from the USB connection unit 153 of the imaging apparatus 150, the control unit 110 transmits to the control unit 160 a control signal that enables a charging path of the switching circuit 106. The control unit 160 receives the control signal and brings the power switches 154 and 156 into the on state. The USB connection unit 153 supplies power to the electronic device 100 via the power switch 154, the power supply circuit 155, the power switch 156, and the connection unit 151. The connection unit 105 supplies the power to the battery 107 or 108 via the switching circuit 106. The switching circuit 106 connects the battery 107 or 108 to a power supply line of the connection unit 105 in a predetermined order.

In step S304, the control unit 110 measures the voltage of the battery 107 or 108 and transmits the voltage of the battery 107 or 108 to the control unit 160. Based on the received voltage of the battery 107 or 108, the control unit 160 controls the power supply circuit 155. Under control of the control unit 160, the power supply circuit 155 controls the charging voltage of the battery 107 or 108. The power supply circuit 155 charges the battery 107 or 108 via the power switch 156, the connection unit 151, the connection unit 105, and the switching circuit 106. Since the connection unit 105 is supplied with power from the USB charger 140 via the imaging apparatus 150, the connection unit 105 supplies the power to the battery 107 or 108, thereby charging the battery 107 or 108. Then, the control unit 110 returns to step S300.

In step S305, the control unit 110 enables a discharging path of the switching circuit 106. For example, the control unit 110 enables a discharging path of the electronic device 100. The battery 107 or 108 supplies power to the power supply circuit 113 via the switching circuit 106 to supply the power to the components of the electronic device 100.

The battery 107 or 108 supplies power to the connection unit 151 of the imaging apparatus 150 via the switching circuit 106 and the connection unit 105. The control unit 110 transmits to the control unit 160 a control signal that enables the discharging path of the switching circuit 106. When the control signal is received, the control unit 160 controls the power supply circuit 152. The connection unit 151 supplies the power to the power supply circuit 152. The power supply circuit 152 supplies the power to the components of the imaging apparatus 150. Consequently, the imaging apparatus 150 operates. The connection unit 105 is connected to the imaging apparatus 150, but is not connected to the USB charger 140 via the imaging apparatus 150. In this case, the battery 107 or 108 supplies power to the imaging apparatus 150 via the connection unit 105. Then, the control unit 110 returns to step S300.

In step S306, the control unit 110 enables the detection circuit 103 and brings the power switch 112 into an on state.

In step S307, the control unit 110 determines whether the USB connection unit 101 is connected to the USB connection unit 143 of the USB charger 140. The detection circuit 103 detects whether the power supply line 120 of the USB connection unit 101 is supplied with power from the USB charger 140. If it is detected that the power supply line 120 of the USB connection unit 101 is supplied with power, the control unit 110 determines that the USB connection unit 101 is connected to the USB connection unit 143 of the USB charger 140. If it is detected that the power supply line 120 of the USB connection unit 101 is not supplied with power, the control unit 110 determines that the USB connection unit 101 is not connected to the USB connection unit 143 of the USB charger 140.

If the control unit 110 determines that the USB connection unit 101 is connected to the USB connection unit 143 of the USB charger 140 (YES in step S307), the control unit 110 advances to step S308. If the control unit 110 determines that the USB connection unit 101 is not connected to the USB connection unit 143 of the USB charger 140 (NO in step S307), the control unit 110 returns to step S300.

In step S308, to charge the battery 107 or 108 based on the supplying of power from the USB connection unit 143 of the USB charger 140, the control unit 110 enables the charging path of the switching circuit 106. For example, the control unit 110 brings the power switches 112 and 104 into the on state. The USB connection unit 101 supplies power to the battery 107 or 108 via the power switch 112, the power supply circuit 102, the power switch 104, and the switching circuit 106. The switching circuit 106 connects the battery 107 or 108 to an output line of the power switch 104 in a predetermined order.

In step S309, the control unit 110 measures the voltage of the battery 107 or 108, and based on the voltage of the battery 107 or 108, controls the power supply circuit 102. Under control of the control unit 110, the power supply circuit 102 controls the charging voltage of the battery 107 or 108. The power supply circuit 102 charges the battery 107 or 108 via the power switch 104 and the switching circuit 106. Since the USB connection unit 101 is supplied with power from the USB charger 140, the USB connection unit 101 supplies the power to the battery 107 or 108 via the power supply circuit 102, thereby charging the battery 107 or 108. The power supply circuit 102 controls the charging voltage of the battery 107 or 108. Then, the control unit 110 returns to step S300.

As described above, even if the imaging apparatus 150 is not connected to the electronic device 100, the electronic device 100 can charge the battery 107 or 108 in the electronic device 100 by connecting to the USB charger 140. Even if the electronic device 100 is not connected to the imaging apparatus 150, the imaging apparatus 150 can charge the battery (not illustrated) within the imaging apparatus 150 by connecting to the USB charger 140. The electronic device 100 can charge the battery 107 or 108 within the electronic device 100 by connecting to the USB charger 140 via the imaging apparatus 150.

In the state where the connection unit 105 of the electronic device 100 is connected to the connection unit 151 of the imaging apparatus 150, the USB connection unit 101 of the electronic device 100 is hidden inside the imaging apparatus 150, and therefore cannot be used. Thus, the charging/discharging of circuits of the electronic device 100 and the imaging apparatus 150 can be simplified and controlling by the control unit 110 is facilitated. The electronic device 100 can also reduce circuit cost and save space.

In each of the state where the imaging apparatus 150 is used alone, the state where the electronic device 100 is used alone, and the state where the imaging apparatus 150 and the electronic device 100 are connected together, a user can see only one USB connection unit that is to be used. Consequently, in each state, a USB connection unit to which the USB charger 140 should connect becomes clear to the user, and the usability of the user is improved.

Second Example Embodiment

Figure 4A:
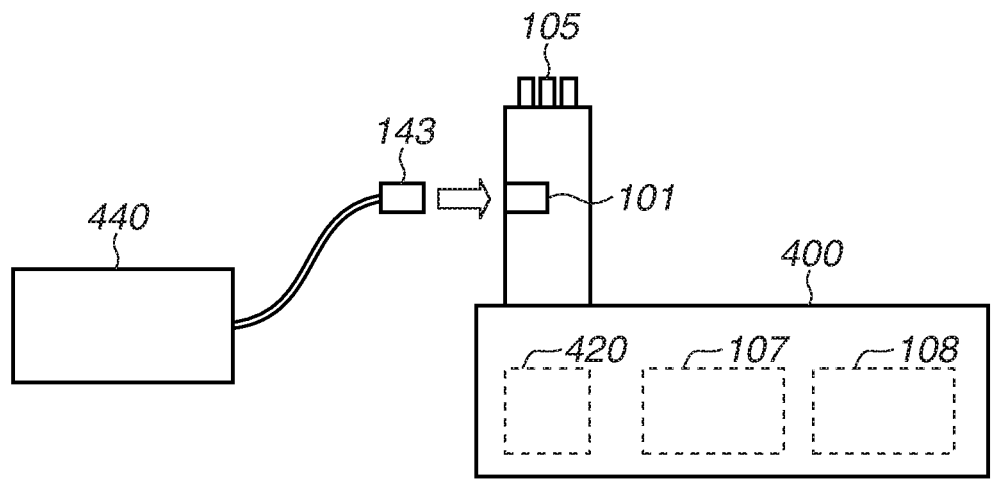
FIG. 4A is a diagram illustrating an example of a connection between an electronic device 400 and an external storage device 440.

A second example embodiment will be described below. FIG. 4A is a diagram illustrating an example of the connection between an electronic device 400 and an external storage device 440 according to the second example embodiment.

The external storage device 440 is, for example, a hard disk drive (HDD) or a solid-state drive (SSD). The external storage device 440 includes a USB connection unit 143 and can store data. Alternatively, the external storage device 440 may be a card reader or a composite apparatus such as a tablet. The USB connection unit 143 illustrated in FIG. 4A is similar to the USB connection unit 143 illustrated in FIG. 1A.

The electronic device 400 includes a USB connection unit 101, a connection unit 105, a battery 107, a battery 108, and a memory 420. The USB connection unit 101, the connection unit 105, the battery 107, and the battery 108 illustrated in FIG. 4A are similar to the USB connection unit 101, the connection unit 105, the battery 107, and the battery 108, illustrated in FIG. 1A. The USB connection unit 101 of the electronic device 400 can connect to the USB connection unit 143 of the external storage device 440.

If the USB connection unit 101 of the electronic device 400 is connected to the USB connection unit 143 of the external storage device 440, the electronic device 400 can transfer data stored in the memory 420 within the electronic device 400 to the external storage device 440. The external storage device 440 stores the transferred data.

The external storage device 440 can transfer data stored within the external storage device 440 to the memory 420 of the electronic device 400. The electronic device 400 stores the transferred data in the memory 420. The memory 420 stores image data of an image captured by an imaging apparatus 450 in FIG. 4B and firmware (a program) for the electronic device 400.

Figure 4B:
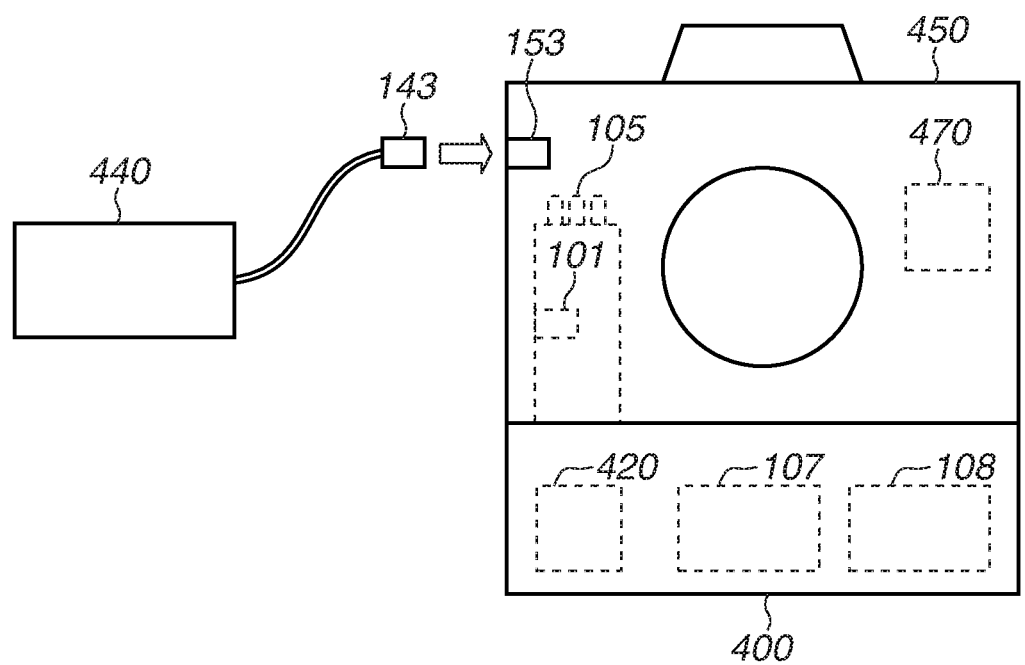
FIG. 4B is a diagram illustrating examples of connections between the electronic device 400, an imaging apparatus 450, and the external storage device 440.

Next, with reference to FIG. 4B, examples of the connections between the electronic device 400, the imaging apparatus 450, and the external storage device 440 are described.

The electronic device 400 is connected to the imaging apparatus 450 via the connection unit 105. One or both of the batteries 107 and 108 supply power to the imaging apparatus 450 via the connection unit 105. The USB connection unit 101 is placed near the connection unit 105. Consequently, in the state where the electronic device 400 is connected to the imaging apparatus 450, the USB connection unit 101 is hidden inside the imaging apparatus 450.

The imaging apparatus 450 is an electronic device (a digital camera or a mobile phone) capable of operating as a digital camera. The imaging apparatus 450 includes a USB connection unit 153 and a memory 470. The USB connection unit 153 illustrated in FIG. 4B is similar to the USB connection unit 153 illustrated in FIG. 1B. The memory 470 is, for example, a memory card. Alternatively, the memory 470 may be a built-in memory. The USB connection unit 153 can connect to the external storage device 440 via the USB connection unit 143. If the external storage device 440 is connected to the imaging apparatus 450 via the USB connection unit 143 in the state where the electronic device 400 is connected to the imaging apparatus 450, the electronic device 400 can transfer the data stored in the memory 420 to the external storage device 440 via the imaging apparatus 450. The external storage device 440 stores the transferred data.

The imaging apparatus 450 can transfer the data stored in the memory 470 to the external storage device 440. The external storage device 440 stores the transferred data.

In the state where the electronic device 400 is connected to the imaging apparatus 450, the USB connection unit 101 is hidden inside the imaging apparatus 450 and cannot be used. Consequently, the electronic device 400 can simplify the data transfer path, facilitate the controlling, and reduce circuit cost.

In the state where the connection unit 105 is connected to the imaging apparatus 450, the USB connection unit 101 is placed at the position where at least a part of the USB connection unit 101 is hidden.

Figure 5A:
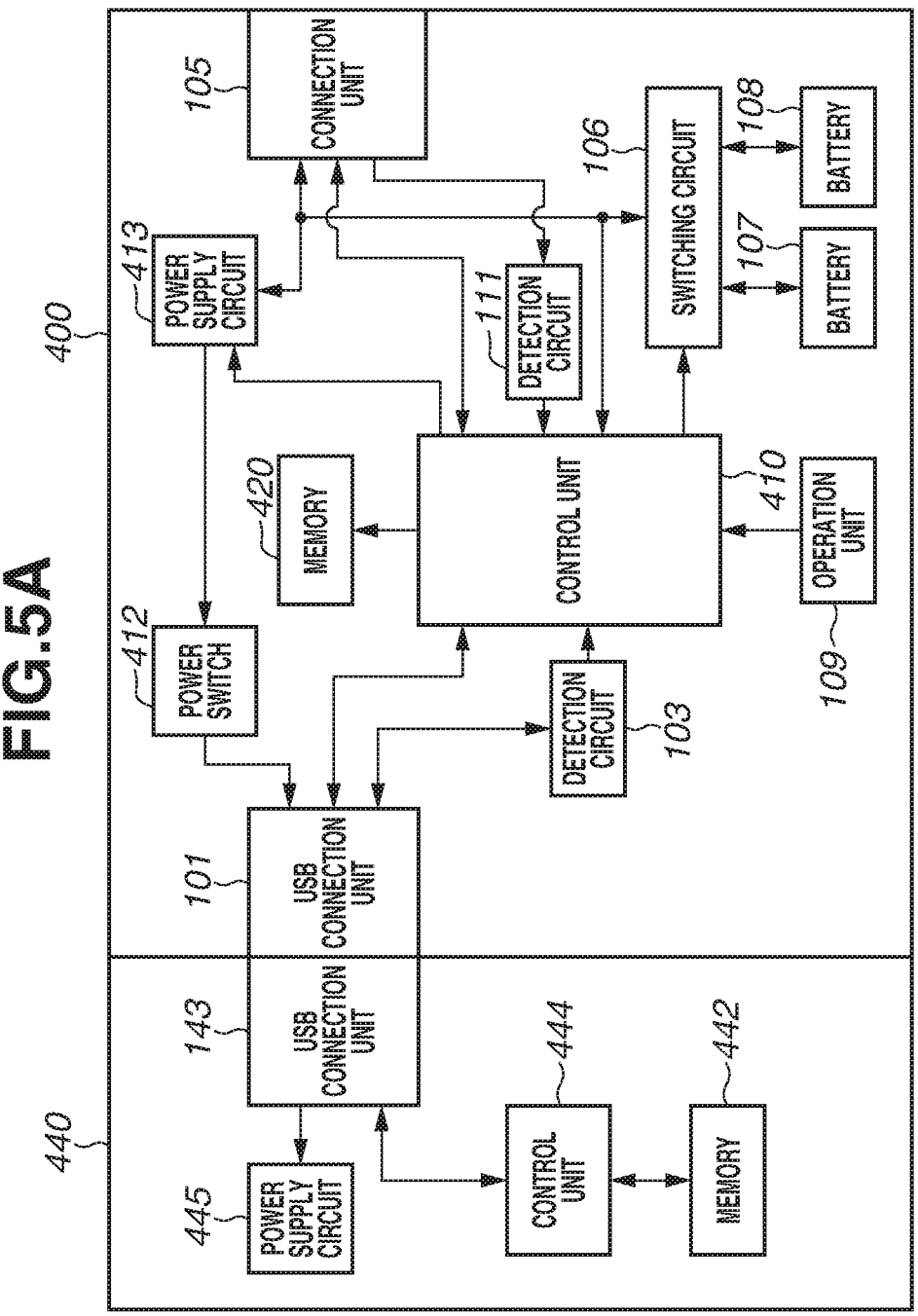
FIG. 5A is a block diagram illustrating examples of configurations of the electronic device 400 and the external storage device 440 illustrated in FIG. 4A.

With reference to FIG. 5A, the components of the electronic device 400 and the external storage device 440 illustrated in FIG. 4A are described.

The electronic device 400 includes the USB connection unit 101, a detection circuit 103, the connection unit 105, a switching circuit 106, the battery 107, the battery 108, an operation unit 109, a detection circuit 111, a control unit 410, a power switch 412, a power supply circuit 413, and the memory 420. The USB connection unit 101, the detection circuit 103, the connection unit 105, and the switching circuit 106 illustrated in FIG. 5A are similar to the USB connection unit 101, the detection circuit 103, the connection unit 105, and the switching circuit 106 illustrated in FIG. 2A. The battery 107, the battery 108, the operation unit 109, and the detection circuit 111 illustrated in FIG. 5A are similar to the battery 107, the battery 108, the operation unit 109, and the detection circuit 111, respectively, illustrated in FIG. 2A.

The external storage device 440 includes the USB connection unit 143, a memory 442, a control unit 444, and a power supply circuit 445. The USB connection unit 143 illustrated in FIG. 5A is similar to the USB connection unit 143 illustrated in FIG. 2A.

The switching circuit 106 connects either of the batteries 107 and 108 to the power supply circuit 413 and the connection unit 105. The battery 107 or 108 supplies power to the power supply circuit 413 via the switching circuit 106. The power supply circuit 413 converts the voltage and supplies the power to the external storage device 440 via the power switch 412 and the USB connection unit 101. The power supply circuit 413 supplies the power to the components of the electronic device 400. If the power switch 412 enters an on state, the power supply circuit 413 supplies the power to the power supply circuit 445 via the power switch 412 and the USB connection units 101 and 143. The power supply circuit 445 supplies the power to the components of the external storage device 440. Consequently, the external storage device 440 operates.

The detection circuit 103 detects whether an overcurrent flows through the USB connection unit 101. If an overcurrent flows through the USB connection unit 101, the control unit 410 brings the power switch 412 into an off state. Consequently, the control unit 410 can prevent the failure of the power supply circuit 413 and the batteries 107 and 108.

The memory 420 is a non-volatile memory such as an HDD or an SSD. The control unit 410 can store, in the memory 420, image data of an image captured by the imaging apparatus 450. The memory 420 stores a firmware program for the control unit 410.

The control unit 410 communicates with the control unit 444 to transfer the data stored in the memory 420 to the memory 442. For example, the control unit 410 reads the data stored in the memory 420 and transmits the read data and a writing control signal to the control unit 444 via the USB connection units 101 and 143. If the writing control signal is received, the control unit 444 writes the received data to the memory 442.

The control unit 410 communicates with the control unit 444 to transfer the data stored in the memory 442 of the external storage device 440 to the memory 420. For example, the control unit 410 transmits a reading control signal regarding data stored at a predetermined address in the memory 442 to the control unit 444 via the USB connection units 101 and 143. If receiving the reading control signal, the control unit 444 reads the data at the predetermined address in the memory 442 and transmits the read data to the control unit 410 via the USB connection units 101 and 143. If the data is received, the control unit 410 writes the received data to the memory 420.

With reference to FIG. 5B, the components of the electronic device 400, the imaging apparatus 450, and the external storage device 440 illustrated in FIG. 4B are described.

When the electronic device 400 is connected to the imaging apparatus 450, the USB connection unit 101 of the electronic device 400 is hidden inside the imaging apparatus 450 and cannot be used. Consequently, the electronic device 400 can simplify a data transfer path, facilitate the controlling, and reduce circuit cost.

The components of the electronic device 400 and the external storage device 440 illustrated in FIG. 5B are similar to the components of the electronic device 400 and the external storage device 440 illustrated in FIG. 5A. The imaging apparatus 450 includes a connection unit 151, the USB connection unit 153, a detection circuit 157, a detection circuit 158, a power supply circuit 452, a control unit 460, and the memory 470. The connection unit 151, the USB connection unit 153, the detection circuit 157, and the detection circuit 158 illustrated in FIG. 5B are similar to the connection unit 151, the USB connection unit 153, the detection circuit 157, and the detection circuit 158 illustrated in FIG. 2B.

The power supply circuit 452 includes, for example, a DC/DC converter or a series regulator. The power supply circuit 452 converts the voltage of a battery (not illustrated) in the imaging apparatus 450 to generate power. The power supply circuit 452 supplies the power to the components of the imaging apparatus 450.

The memory 470 is a memory card or a built-in memory and stores image data of an image captured by the imaging apparatus 450.

First, a case is described where the imaging apparatus 450 is not connected to the electronic device 400 and the external storage device 440. In this case, the battery (not illustrated) within the imaging apparatus 450 supplies power to the power supply circuit 452. The power supply circuit 452 converts the voltage and supplies the power to the components of the imaging apparatus 450 to operate the imaging apparatus 450. For example, an image capture unit of the imaging apparatus 450 can capture an object image and generate image data of the captured image. The control unit 460 can record the image data generated by the image capture unit in the memory 470.

Next, a case is described where the imaging apparatus 450 is connected to the electronic device 400 and is not connected to the external storage device 440. The connection unit 151 of the imaging apparatus 450 is connected to the connection unit 105 of the electronic device 400. The imaging apparatus 450 can transfer the data stored in the memory 470 to the memory 420 of the electronic device 400 via the connection unit 151.

Next, a case is described where the imaging apparatus 450 is connected to the external storage device 440 and is not connected to the electronic device 400. The USB connection unit 153 of the imaging apparatus 450 is connected to the USB connection unit 143 of the external storage device 440. The imaging apparatus 450 can transfer the data stored in the memory 470 to the memory 442 of the external storage device 440 via the USB connection unit 153.

Next, a case is described where the electronic device 400 is connected to the external storage device 440 via the imaging apparatus 450. The connection unit 105 of the electronic device 400 is connected to the connection unit 151 of the imaging apparatus 450. The USB connection unit 143 of the external storage device 440 is connected to the USB connection unit 153 of the imaging apparatus 450. The electronic device 400 can transfer the data stored in the memory 420 to the memory 442 of the external storage device 440 via the imaging apparatus 450. For example, the control unit 410 reads the data from the memory 420 and transmits the read data and a writing control signal to the control unit 444 via the connection unit 105, the control unit 460, and the USB connection unit 153. When the control unit 444 receives the writing control signal, the control unit 444 writes the received data to the memory 442.

The imaging apparatus 450 can transfer the data stored in the memory 470 to the memory 442 of the external storage device 440. For example, the control unit 460 reads the data from the memory 470 and transmits the read data and a writing control signal to the control unit 444 via the USB connection unit 153. When the control unit 444 receives the writing control signal, the control unit 444 writes the received data to the memory 442.

As described above, in the state where the electronic device 400 is connected to the external storage device 440, the electronic device 400 can transfer the data between the memories 420 and 442. In the state where the imaging apparatus 450 is connected to the external storage device 440, the imaging apparatus 450 can transfer the data between the memories 470 and 442. In the state where the electronic device 400 is connected to the external storage device 440 via the imaging apparatus 450, the electronic device 400 can transfer the data between the memories 420 and 442.

In the state where the connection unit 105 of the electronic device 400 is connected to the connection unit 151 of the imaging apparatus 450, the USB connection unit 101 of the electronic device 400 is hidden inside the imaging apparatus 450, and therefore cannot be used. The configuration simplifies circuits related to data transfer of the electronic device 400 and facilitates the controlling by the control unit 410. The electronic device 400 can also reduce circuit cost and save a space.

In each of the state where the imaging apparatus 450 is used alone, the state where the electronic device 400 is used alone, and the state where the imaging apparatus 450 and the electronic device 400 are connected together, the user can see only one USB connection unit that is to be used. Consequently, in each state, a USB connection unit to which the external storage device 440 should connect becomes clear to the user, and the usability of the user is improved.

Next, with reference to the flowchart in FIG. 3, a control method according to the second example embodiment is described.

In step S300, the control unit 410 determines whether the connection unit 105 is connected to the imaging apparatus 450. If the control unit 410 determines that the connection unit 105 is connected to the imaging apparatus 450 (YES in step S300), the control unit 410 advances to step S301. If the control unit 410 determines that the connection unit 105 is not connected to the imaging apparatus 450 (NO in step S300), the control unit 410 advances to step S306.

In step S301, the control unit 410 disables the detection circuit 103.

In step S302, the control unit 410 determines whether the connection unit 105 is connected to the external storage device 440 via the imaging apparatus 450. If the control unit 410 determines that the connection unit 105 is connected to the external storage device 440 via the imaging apparatus 450 (YES in step S302), the control unit 410 advances to step S303. If the control unit 410 determines that the connection unit 105 is not connected to the external storage device 440 via the imaging apparatus 450 (NO in step S302), the control unit 410 advances to step S305.

In steps S303 and S304, the control unit 410 controls data transfer between the electronic device 400 and the external storage device 440 via the connection unit 105 and the imaging apparatus 450.

In step S305, the control unit 410 controls data transfer between the electronic device 400 and the imaging apparatus 450 via the connection unit 105.

In step S306, the control unit 410 enables the detection circuit 103.

In step S307, the detection circuit 103 detects whether the USB connection unit 101 is connected to the external storage device 440. If the control unit 410 determines that the USB connection unit 101 is connected to the external storage device 440 (YES in step S307), the control unit 410 advances to step S308. If the control unit 410 determines that the USB connection unit 101 is not connected to the external storage device 440 (NO in step S307), the control unit 410 returns to step S300.

In steps S308 and S309, the control unit 410 controls data transfer between the electronic device 400 and the external storage device 440 via the USB connection unit 101.

Second Example Embodiment

A third example embodiment will be described below. The various functions, processes, or methods described above in the first and second example embodiments can also be implemented by a personal computer, a microcomputer, a central processing unit (CPU), or a processor with a program. In the third example embodiment described below, a personal computer, a microcomputer, a CPU, and a processor will be referred to as a computer X. Further, in the third example embodiment, a program for controlling the computer X and implementing the various functions, processes, or methods described above in the first and second example embodiments will be referred to as a program Y.

The computer X executes the program Y to implement the various functions, processes, or methods described above in the first and second example embodiments. In this case, the program Y is supplied to the computer X via a computer-readable storage medium. The computer-readable storage medium according to the third example embodiment includes at least one of a hard disk apparatus, a magnetic storage apparatus, an optical storage apparatus, a magneto-optical storage apparatus, a memory card, a volatile memory, and a non-volatile memory. The computer-readable storage medium according to the third example embodiment is a non-transitory storage medium.

While aspects of the disclosure are described with reference to example embodiments, it is to be understood that the aspects of the disclosure are not limited to the example embodiments. The scope of the following claims is to be accorded the broadest interpretation so as to encompass all modifications and equivalent structures.

This application claims priority from Japanese Patent Application No. 2019-092845, filed May 16, 2019, which is hereby incorporated by reference herein in its entirety.

What is claimed is:

1. An electronic device comprising:
   a first connection unit configured to connect to a first external device; and
   a second connection unit configured to connect to a second external device,
   wherein a battery is charged with power supplied from the first external device via the second connection unit, in a case where the second external device is connected to the second connection unit and the first external device is connected to the second external device,
   wherein the battery supplies power to the second external device via the second connection unit, in a case where the second external device is connected to the second connection unit and the first external device is not connected to the second external device, and
   wherein a position of the first connection unit placed in the electronic device is a position where at least a part of the first connection unit is hidden in a case where the second external device is connected to the second connection unit.

2. The electronic device according to claim 1, wherein the battery is charged with power supplied from the first external device via the first connection unit, in a case where the second external device is not connected to the second connection unit and the first external device is connected to the first connection unit.

3. The electronic device according to claim 1, further comprising a charging unit that charges the battery with power supplied from the first external device.

4. The electronic device according to claim 1, further comprising a switch provided between the first connection unit and the battery,
   wherein the switch enters an off state in a case where the second external device is connected to the second connection unit, and the switch enters an on state in a case where the second external device is not connected to the second connection unit.

5. The electronic device according to claim 1, further comprising a detection unit that detects whether the first connection unit is supplied with power from the first external device,
   wherein the detection unit is enabled in a case where the second external device is not connected to the second connection unit, and the detection unit is disabled in a case where the second external device is connected to the second connection unit.

6. The electronic device according to claim 1, wherein the first external device is a power supply device, and the second external device is an imaging apparatus.

7. An electronic device comprising:
   a first connection unit configured to connect to a first external device;
   a second connection unit configured to connect to a second external device; and
   a control unit that controls data transfer performed between the electronic device and the first external device via the second connection unit and the second external device, in a case where the second external device is connected to the second connection unit and the first external device is connected to the second external device,
   wherein a position of the first connection unit placed in the electronic device is a position where at least a part of the first connection unit is hidden in a case where the second external device is connected to the second connection unit.

8. The electronic device according to claim 7, wherein the control unit controls data transfer performed between the electronic device and the first external device via the first connection unit, in a case where the second external device is not connected to the second connection unit and the first external device is connected to the first connection unit.

9. The electronic device according to claim 7, wherein the control unit controls data transfer performed between the electronic device and the second external device via the second connection unit, in a case where the second external device is connected to the second connection unit and the first external device is not connected to the second external device.

10. The electronic device according to claim 7, wherein the first external device is a storage device, and the second external device is an imaging apparatus.

11. A method comprising:
    determining whether a first external device is connected to a first connection unit of an electronic device;
    determining whether a second external device is connected to a second connection unit of the electronic device;
    charging a battery with power supplied from the first external device via the second connection unit, in a case where the second external device is connected to the second connection unit and the first external device is connected to the second external device; and
    supplying power from the battery to the second external device via the second connection unit, in a case where the second external device is connected to the second connection unit and the first external device is not connected to the second external device,
    wherein a position of the first connection unit placed in the electronic device is a position where at least a part of the first connection unit is hidden in a case where the second external device is connected to the second connection unit.

12. The method according to claim 11, wherein the first external device is a power supply device, and the second external device is an imaging apparatus.

13. A non-transitory storage medium that stores a program causing a computer to execute a method, the method comprising:
    determining whether a first external device is connected to a first connection unit of an electronic device;
    determining whether a second external device is connected to a second connection unit of the electronic device;
    charging a battery with power supplied from the first external device via the second connection unit, in a case where the second external device is connected to the second connection unit and the first external device is connected to the second external device; and
    supplying power from the battery to the second external device via the second connection unit, in a case where the second external device is connected to the second connection unit and the first external device is not connected to the second external device, wherein a position of the first connection unit placed in the electronic device is a position where at least a part of the first connection unit is hidden in a case where the second external device is connected to the second connection unit.

14. The non-transitory storage medium according to claim 13, wherein the first external device is a power supply device, and the second external device is an imaging apparatus.

15. A method comprising:
- determining whether a first external device is connected to a first connection unit of an electronic device;
- determining whether a second external device is connected to a second connection unit of the electronic device; and
- controlling data transfer performed between the electronic device and the first external device via the second connection unit and the second external device, in a case where the second external device is connected to the second connection unit and the first external device is connected to the second external device,
- wherein a position of the first connection unit placed in the electronic device is a position where at least a part of the first connection unit is hidden in a case where the second external device is connected to the second connection unit.

16. The method according to claim 15, wherein the first external device is a storage device, and the second external device is an imaging apparatus.

17. A non-transitory storage medium that stores a program causing a computer to execute a method, the method comprising:
- determining whether a first external device is connected to a first connection unit of an electronic device;
- determining whether a second external device is connected to a second connection unit of the electronic device; and
- controlling data transfer performed between the electronic device and the first external device via the second connection unit and the second external device, in a case where the second external device is connected to the second connection unit and the first external device is connected to the second external device,
- wherein a position of the first connection unit placed in the electronic device is a position where at least a part of the first connection unit is hidden in a case where the second external device is connected to the second connection unit.

18. The non-transitory storage medium according to claim 17, wherein the first external device is a storage device, and the second external device is an imaging apparatus.

* * * * *